United States Patent
Black et al.

(10) Patent No.: US 7,149,264 B2
(45) Date of Patent: Dec. 12, 2006

(54) CDMA PILOT ASSISTED CHANNEL ESTIMATION

(75) Inventors: Peter J. Black, San Diego, CA (US); Hao Xu, San Diego, CA (US); June Namgoong, Chula Vista, CA (US); Srikant Jayaraman, San Diego, CA (US)

(73) Assignee: Qualcomm, Incorporated, San Diego, CA (US)

( * ) Notice: Subject to any disclaimer, the term of this patent is extended or adjusted under 35 U.S.C. 154(b) by 0 days.

(21) Appl. No.: 11/102,301

(22) Filed: Apr. 8, 2005

(65) Prior Publication Data

US 2005/0276364 A1      Dec. 15, 2005

Related U.S. Application Data

(60) Provisional application No. 60/579,874, filed on Jun. 14, 2004.

(51) Int. Cl.
*H04B 1/10* (2006.01)
(52) U.S. Cl. ............... 375/349; 375/130; 375/136
(58) Field of Classification Search ........... 375/316, 375/340, 347, 349, 130, 136; 370/320, 335, 370/342, 441, 208
See application file for complete search history.

(56) References Cited

U.S. PATENT DOCUMENTS

| 2004/0228267 | A1* | 11/2004 | Agrawal et al. | 370/203 |
| 2005/0063345 | A1* | 3/2005 | Wu et al. | 370/335 |
| 2006/0018279 | A1* | 1/2006 | Agrawal et al. | 370/330 |

OTHER PUBLICATIONS

Tang, Haiyun et al., "Interpolation-based maximum likelihood channel estimation using OFDM pilot symbols", Globecom'02, 2002—IEEE Global Telecommunications Conference, New York, NY: IEEE, US, vol. 1 of 3, Nov. 17, 2002, pp. 1860-1864.
Copy of PCT International Search Report (4 pgs.).

* cited by examiner

*Primary Examiner*—Emmanuel Bayard
(74) *Attorney, Agent, or Firm*—Philip Wadsworth; Sandra L. Godsey

(57) ABSTRACT

A pilot assisted channel estimation process. A receiver may be configured to estimate the impulse response of a channel from a signal having pilot tones and spread-spectrum pilot signals. The receiver estimates the response of the channel from the pilot tones, and adapts the length of delay the channel response is estimated based on the spread-spectrum pilot signals.

32 Claims, 3 Drawing Sheets ns system. The telecommu-

CDMA PILOT ASSISTED CHANNEL ESTIMATION

CLAIM OF PRIORITY UNDER 35 U.S.C. §119

The present Application for Patent claims priority to Provisional Application No. 60/579,874 entitled "Pilot Assisted Channel Estimation," filed Jun. 14, 2004, assigned to the assignee hereof and hereby expressly incorporated by reference herein.

BACKGROUND

1. Field

The present disclosure relates generally to telecommunications, and more specifically, to pilot assisted channel estimation techniques.

2. Background

In a typical telecommunications system, the data to be transmitted is encoded with a turbo code, which generates a sequence of symbols, referred to as "code symbols." Several code symbols may be blocked together and mapped to a point on a signal constellation, thereby generating a sequence of complex "modulation symbols." This sequence may be applied to a modulator, which generates a continuous time signal, which is transmitted over a wireless channel.

At the receiver, the demodulator generates a sequence of soft decisions. Each soft decision represents an estimate of a modulation symbol that was transmitted over the channel. The estimates may be used to compute the Log-Likelihood Ratio (LLR) of the code symbols. The turbo decoder uses the sequence of code symbol LLRs in order to decode the data that was originally transmitted.

When computing the LLRs of the code symbols, the propagation conditions of the channel should be considered. The channel conditions, or the channel impulse response, may be estimated at the receiver from a known pilot sequence embedded in the data transmission. By way of example, in Orthogonal Frequency Division Multiplexing (OFDM) systems, a Least Squares (LS) procedure is often used to estimate the channel. Using this procedure, the channel may be estimated from a set of pilot tones equally spaced across the frequency band $½T \leq f \leq ½T$, provided the time interval of the channel's impulse response LT is less than PT, where L is the delay spread in chips between arriving signals, T is the chip duration (time), LT is the time delay, where P is the number of pilot tones and T is the chip duration, and PT is the pilot time duration. Moreover, it can be shown that the channel estimation variance or error is proportional to L and inversely proportional to P.

Assuming equal noise power across the frequency tones, the channel estimation variance can be represented by the following equation:

$$\sigma_e^2 = \frac{L}{P}\sigma^2 \qquad (1)$$

where $\sigma_e^2$ denotes the variance of the channel estimate, and $\sigma^2$ denotes noise variance per tone.

Typically, a channel estimator in the receiver has a fixed delay spread LT, where L=P. However, this may lead to an unnecessarily large channel estimation variance when the actual impulse response of the channel is small. The channel estimation variance could be improved if the delay spread LT at the receiver is adapted in accordance with the time varying nature of the channel as seen by the receiver.

SUMMARY

In one aspect of the present invention, a method of channel estimation includes receiving a signal from a multipath fading channel, the signal including a plurality of pilot tones, deriving timing information for a plurality of multipath signal arrivals, estimating the response of the channel from the pilot tones, and adapting the length of time the channel response is estimated from the timing information for the multipath signal arrivals.

In another aspect of the present invention, a method of channel estimation includes receiving a signal including a plurality of pilot tones and spread-spectrum pilot signals, estimating the response of the channel from the pilot tones, and adapting the length of time the channel response is estimated based on the spread-spectrum pilot signals.

In yet another aspect of the present invention, a receiver includes a rake receiver configured to derive timing information from a signal transmitted over a multipath fading channel, the timing information relating to a plurality of multipath signal arrivals, and a demodulator configured to extract a plurality of pilot tones from the signal, the demodulator including a channel estimator having a delay spread capable of being adapted by the timing information from the rake receiver, the channel estimator being configured to estimate the response of the channel from the pilot tones.

In a further aspect of the present invention, a receiver includes a rake receiver configured to derive timing information from a plurality of spread-spectrum pilot signals in a signal transmitted over a channel, and a demodulator configured to extract a plurality of pilot tones from the signal, the demodulator including a channel estimator having a delay spread capable of being adapted by the timing information from the rake receiver, the channel estimator being configured to estimate the response of the channel from the pilot tones.

DETAILED DESCRIPTION

The detailed description set forth below in connection with the appended drawings is intended as a description of various embodiments of the present invention and is not intended to represent the only embodiments in which the present invention may be practiced. The detailed description includes specific details for the purpose of providing a thorough understanding of the present invention. However, it will be apparent to those skilled in the art that the present invention may be practiced without these specific details. In some instances, well-known structures and components are shown in block diagram form in order to avoid obscuring the concepts of the present invention.

Figure 1:
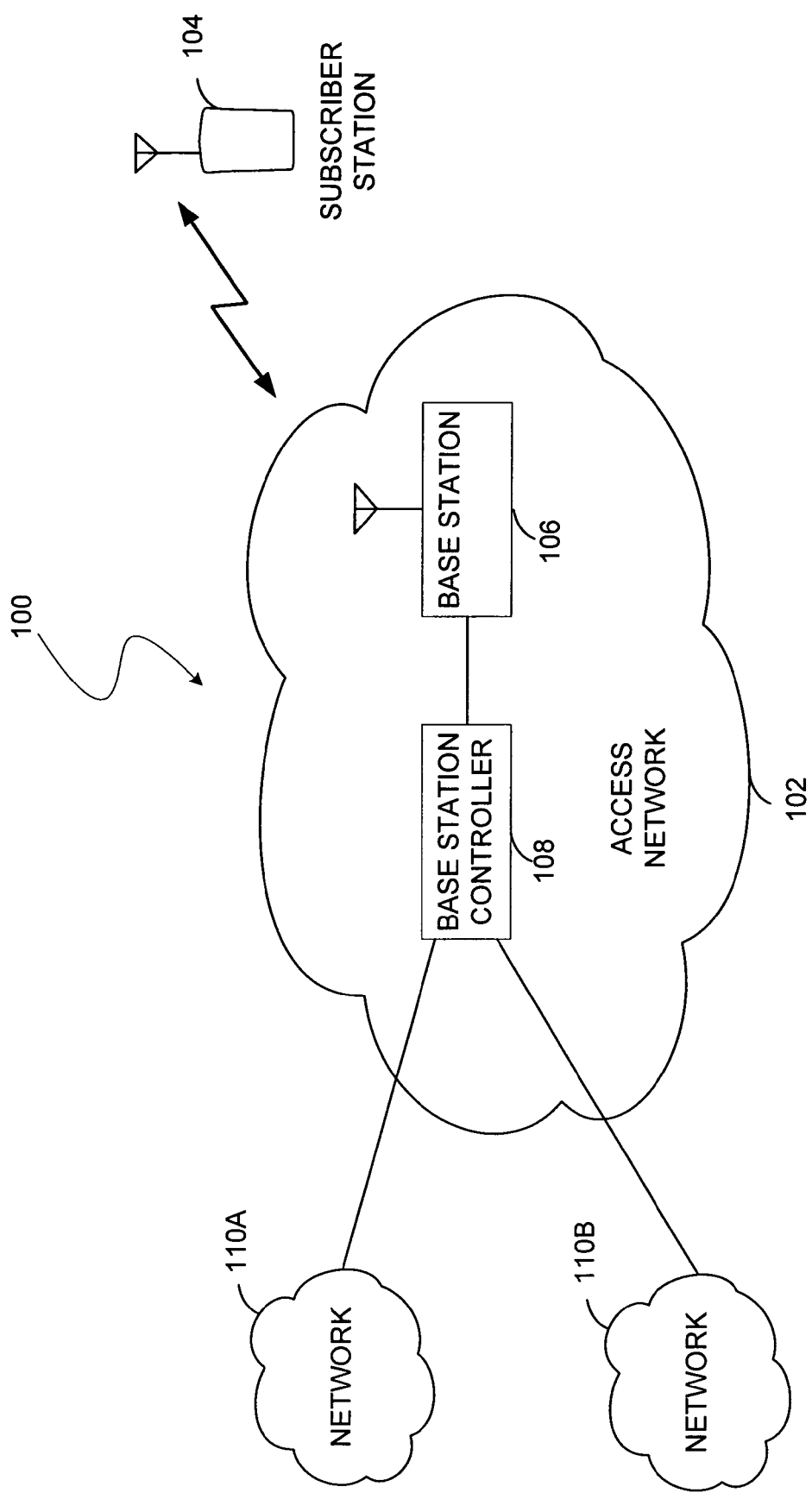
FIG. 1 is a conceptual block diagram illustrating an example of a telecommunications system.

FIG. 1 is a conceptual block diagram illustrating an example of a telecommunications system. The telecommunications system 100 may include an Access Network (AN) 102 which supports communications between any number of Access Terminals (ATs) 104. The access network 102 may also be connected to additional networks 110A and 110B outside the access network 102, such as the Internet, a corporate intranet, a Public Switched Telephone Network (PSTN), a broadcast network, or any other network. The access terminal 104 may be any type of fixed or mobile device that can communicate with the access network 102 including a wireless handset or telephone, a cellular telephone, a data transceiver, a paging receiver, a position determination receiver, a modem, or the any other wireless terminal.

The access network 102 may be implemented with any number of base stations dispersed throughout a geographic region. The geographic region may be subdivided into smaller regions known as cells with a base station serving each cell. In high traffic applications, the cell may be further divided into sectors with a base station serving each sector. For simplicity, one base station 106 is shown. A base station controller 108 may be used to coordinate the activities of multiple base stations, as well as provide an interface to the networks outside the access network 102.

The telecommunications system 100 may be implemented with any number of different technologies. Code Division-Multiple Access (CDMA) is just one example. CDMA is a modulation and multiple access scheme based on spread-spectrum communications. In a CDMA telecommunications system, a large number of signals share the same frequency spectrum and, as a result, such system provides high user capacity. This is achieved by transmitting each signal with a different code that modulates a carrier, and thereby, spreads the spectrum of the signal waveform. The transmitted signals are separated in the receiver by a demodulator that uses a corresponding code to despread the signal. The undesired signal(s), whose code(s) does not match, is not despread and contributes only to noise. CDMA is well known in the art.

OFDM is another example of a access scheme suitable for telecommunications. OFDM is a spread-spectrum technique that distributes data over a large number of carriers spaced apart at precise frequencies. The spacing provides the "orthogonality" that prevents a demodulator at the receiver from seeing frequencies other than those intended for the receiver. OFDM, which is also well known in the art, is commonly used for commercial and private broadcasts, but is not limited to such applications.

More recently, hybrid telecommunication systems supporting both CDMA and OFDM operations have been deployed. These telecommunication systems have been gaining widespread acceptance in the area of broadcast services which are integrated into existing infrastructures originally designed to support point-to-point communications with an access terminal. In these hybrid systems, the access network 102 may be used to puncture OFDM transmissions into a CDMA waveform.

Figure 2:
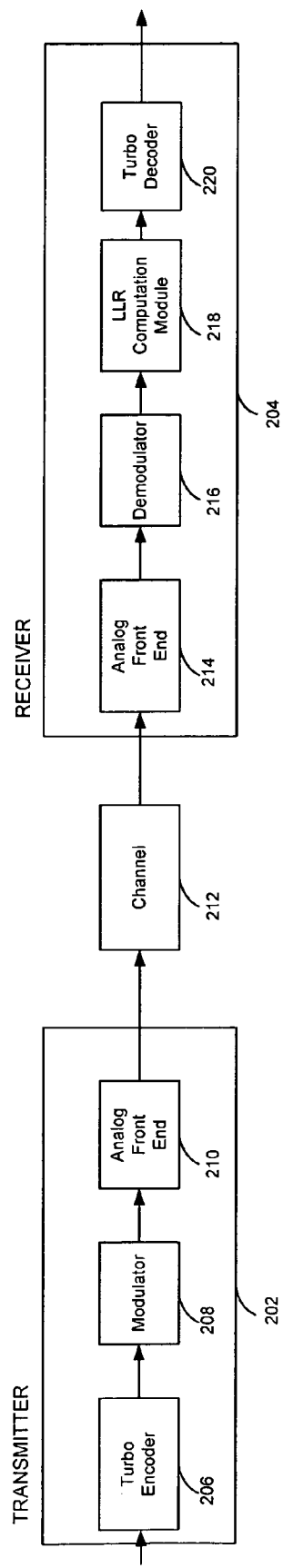
FIG. 2 is a conceptual block diagram illustrating an example of a transmitter in communication with a receiver.

FIG. 2 is a conceptual block diagram illustrating an example of a transmitter in communication with a receiver. The transmitter 202 and receiver 204 may be stand-alone entities, or integrated into the telecommunications system of FIG. 1 or any other telecommunications system. In the telecommunications system of FIG. 1, the transmitter 202 may be in the base station 106 and the receiver 204 may be in the access terminal 104. Alternatively, the transmitter 202 may be in the access terminal 104 and the receiver 204 may be in the base station 106.

At the transmitter 202, a Turbo encoder 206 may be used to apply a coding process to the data to facilitate Forward Error Correction (FEC). The coding process results in a sequence of code symbols with redundancy that the receiver 204 may use to correct errors. The code symbols may be provided to a modulator 208 where they are blocked together and mapped to coordinates on a signal constellation. The coordinates of each point in the signal constellation represents the baseband quadrature components that are used by an analog front end 210 to modulate quadrature carrier signals before transmission over a wireless channel 212.

An analog front end 214 in the receiver 204 may be used to convert the quadrature carrier signals to their baseband components. A demodulator 216 may translate the baseband components back to the correct point in the signal constellation. Because of noise and other disturbances in the channel 212, the baseband components may not correspond to an exact location of a point in the original signal constellation. The demodulator 216 detects which modulation symbol was most likely transmitted by finding the smallest distance between the received point and the location of a valid symbol in the signal constellation. These soft decisions are used by an LLR computation module 218 to determine the LLR of the code symbols associated with the given modulation symbols. A Turbo decoder 220 uses the sequence of code symbol LLRs in order to decode the data that was originally transmitted.

When detecting the transmitted modulation symbols in the demodulator, the impulse response of the channel should be considered. Various techniques may be employed at the receiver 204 to estimate the channel's impulse response. A common example is a Least Squares procedure, which was discussed earlier in the background portion of this disclosure, but other well known procedures may also be used. In a CDMA telecommunications system, these procedures may produce a channel estimate that is an order of magnitude less noisy than the data due to coherent processing gain, as well as simpler channel parameterization. As a result, channel estimation error can usually be neglected when detecting the transmitted modulation symbols. However, the channel estimate often has a variance comparable to the noise in the received data in an OFDM telecommunications system. In such cases, it may be desirable to constrain the channel estimation variance prior to detecting the transmitted modulation symbols.

One way to increase the accuracy of the channel estimate in an OFDM telecommunications system is to increase the number of pilot tones across the frequency band. This approach, however, allocates more resources to the channel estimate process that could otherwise be used for transmitting data, and therefore, may not be the most desirable approach for a variety of situations. Alternatively, the channel estimator's delay spread LT may be adapted with changing channel conditions. With this approach, the channel estimation variance or error may be reduced, when the time dispersion of the channel is small, by a corresponding reduction in L as shown in equation (1). In a hybrid telecommunications system that supports both OFDM and CDMA operations, the delay spread LT may be adapted based on information obtained from the CDMA pilot signals. Specifically, information from a rake receiver in the CDMA demodulator may be used to determine the time interval of the channel's impulse response as seen by the receiver 204, and this information may be used to adapt the delay spread LT of the channel estimator.

Figure 3:
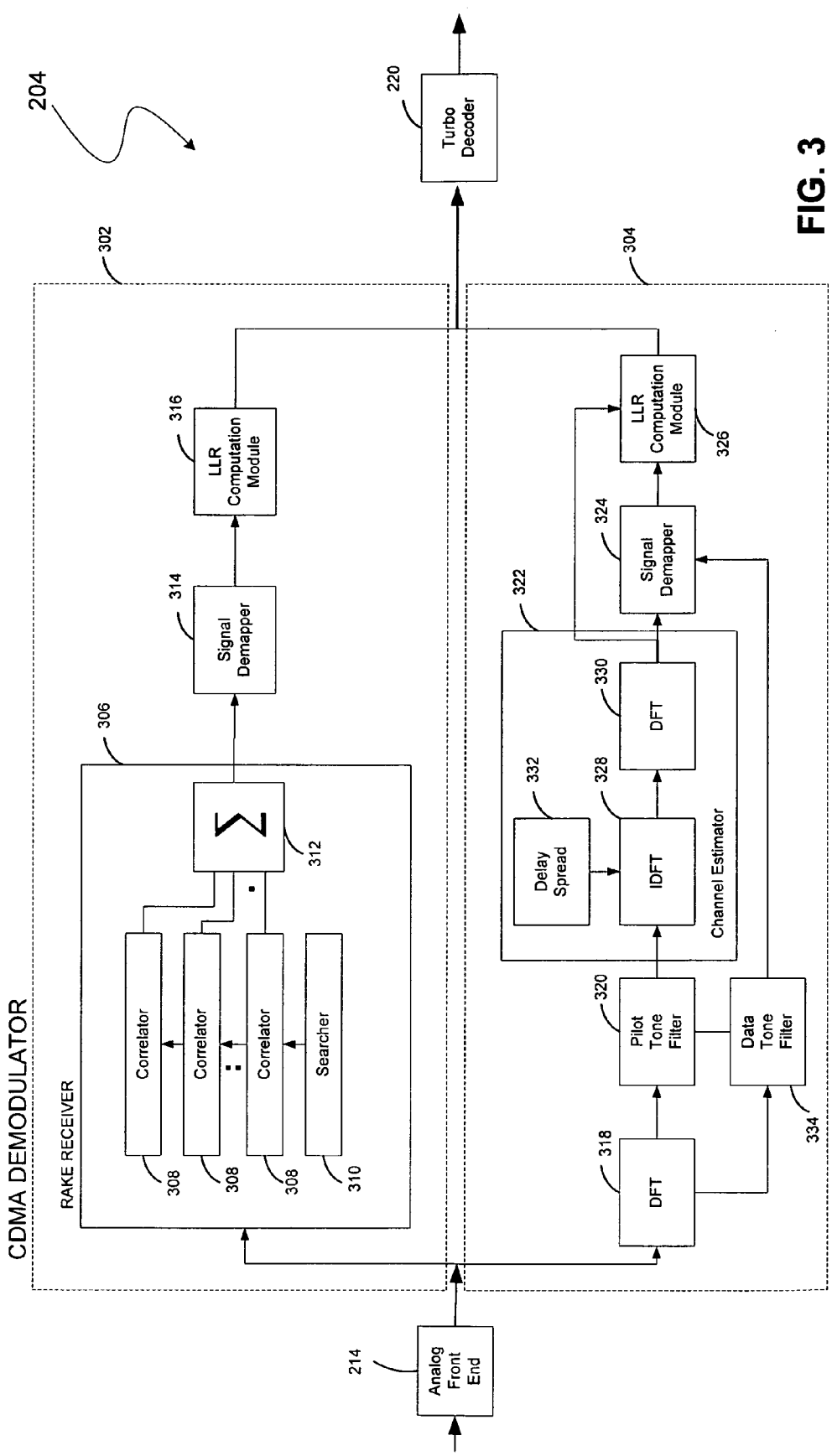
FIG. 3 is a conceptual block diagram illustrating the functionality of a receiver supporting both CDMA and OFDM operations.

FIG. 3 is a conceptual block diagram illustrating the functionality of a receiver supporting both CDMA and OFDM operations. The receiver 204 may include a CDMA demodulator 302 and OFDM demodulator 304, which may be integrated into a single processing entity such as a microprocessor, Digital Signal Processor (DSP), or any other hardware and/or software based processing entity. Alternatively, each of the demodulators 302 and 304 may be a separate processing entity such as a microprocessor, DSP, programmable logic or dedicated hardware, or may distributed among any number of processing entities in the access terminal.

The CDMA demodulator 302 may include a rake receiver 306 to achieve diversity gain in a mulitpath fading channel environment. The rake receiver 306 may be configured to process each multipath signal with a separate correlator 308. A searcher 310 may be used to identify strong multipath signal arrivals. This may be achieved by searching through the baseband quadrature components to find the pilot signal for each multipath. The searcher 310 may perform this function by correlating the baseband quadrature components with a locally generated replica of the spread-spectrum pilot signal. Fingers may then be assigned by the searcher 310 to identify the timing offsets of the multipaths. A different finger may be used by each correlator 308 as a timing reference for spread-spectrum processing. The individual outputs of the correlators 308 may be coherently combined in an adder 312. The result may be provided to a signal demapper 314 and an LLR computation module 316 in the CDMA demodulator 302.

The OFDM demodulator 304 may include a Discrete Fourier Transform (DFT) 318, which may be used to process OFDM symbols. A timing reference may be provided to the DFT 318 from the rake receiver 306 to synchronize the DFT 318. The timing reference may be the finger assignment corresponding to the earliest multipath arrival. In at least one embodiment of the OFDM demodulator 304, the DFT 318 initiates processing of an OFDM symbol at some predetermined back-off time from the earliest multipath arrival to account for the anti-causal portion of the transmit and receive pulse shaping filters. By way of example, the DFT 318 may be configured to begin processing an OFDM symbol ten chips prior to the earliest multipath arrival, where one "chip" is a unit of time defined by T.

The DFT 318 may be used to convert an OFDM signal in the time domain to the frequency domain. In the frequency domain, the information on each carrier or tone is separated into a separate frequency bin. The pilot tones, which are equally spaced across the frequency band and interspersed with the data tones, may be provided by a pilot tone filter 320 to a channel estimator 322. The pilot tone filter 320 may be implemented with a decimator, or other suitable device. The pilot tone filter 320 may provide signaling to a data tone filter 334 indicating when to send the data tones from the DFT 318 to a signal demapper 324. The signal demapper 324 makes a soft decision as to the modulation symbol in the signal constellation most likely transmitted on the data tone. This decision may be based, in part, on the impulse response of the channel. A channel estimator 322 may be used to provide this information to the signal demapper 324. The channel estimator 322 may estimate the impulse response of the channel from the pilot tones using a Least Squares procedure, or any other suitable channel estimation procedure.

The channel estimator 322 may be implemented with an Inverse Discrete Fourier Transform (IDFT) 328. The IDFT 328 converts the pilot tones from the frequency domain into P samples of the channel impulse response in the time domain. The channel's frequency response may then be estimated for all frequency tones from the P samples using an interpolation process. This function may be performed by a DFT 330 in the channel estimator 322.

The number of samples used by the DFT 330 to estimate the channel's impulse response is determined by its delay spread 332. Improvements in the channel estimation variance may be realized by reducing the number of samples from P to L. The delay spread L (in chips) may be determined from the finger assignments for the earliest multipath arrival ($T_{min}$) and the latest multipath arrival ($T_{max}$), where $T_{max}$ and $T_{min}$ are measured in chips. The delay spread L may then be computed from the following equations:

$$L_1 = T_{max} - T_{min} + T_{pulse} \tag{2}$$

$$L_2 = \min\{P, L_1\} \tag{3}$$

$$L = \max\{T_0, L_2\} \tag{4}$$

where $T_{pulse}$ accounts for the delay dispersion introduced by the pulse-shaping filters in the transmitter and receiver, and P and $T_0$ sets the upper and lower limits of the delay spread, respectively. By way of example, in an OFDM telecommunications system having 64 pilot tones P integrated into a CDMA access terminal, $T_{pulse}$ may be set to 16 chips to account for the combined response of the pulse shaping filters in the transmitter and receiver, and the minimum delay spread $T_{min}$ may be set to 32 chips.

The various illustrative logical blocks, modules, circuits, elements, and/or components described in connection with the embodiments disclosed herein may be implemented or performed with a general purpose processor, a digital signal processor (DSP), an application specific integrated circuit (ASIC), a field programmable gate array (FPGA) or other programmable logic component, discrete gate or transistor logic, discrete hardware components, or any combination thereof designed to perform the functions described herein. A general-purpose processor may be a microprocessor, but in the alternative, the processor may be any conventional processor, controller, microcontroller, or state machine. A processor may also be implemented as a combination of computing components, e.g., a combination of a DSP and a microprocessor, a plurality of microprocessors, one or more microprocessors in conjunction with a DSP core, or any other such configuration.

The methods or algorithms described in connection with the embodiments disclosed herein may be embodied directly in hardware, in a software module executed by a processor, or in a combination of the two. A software module may reside in RAM memory, flash memory, ROM memory, EPROM memory, EEPROM memory, registers, hard disk, a removable disk, a CD-ROM, or any other form of storage medium known in the art. A storage medium may be coupled to the processor such that the processor can read information from, and write information to, the storage medium. In the alternative, the storage medium may be integral to the processor.

The previous description of the disclosed embodiments is provided to enable any person skilled in the art to make or use the present invention. Various modifications to these embodiments will be readily apparent to those skilled in the art, and the generic principles defined herein may be applied to other embodiments without departing from the spirit or scope of the invention. Thus, the present invention is not intended to be limited to the embodiments shown herein, but is to be accorded the full scope consistent with the claims, wherein reference to an element in the singular is not intended to mean "one and only one" unless specifically so stated, but rather "one or more." All structural and functional equivalents to the elements of the various embodiments described throughout this disclosure that are known or later come to be known to those of ordinary skill in the art are expressly incorporated herein by reference and are intended to be encompassed by the claims. Moreover, nothing disclosed herein is intended to be dedicated to the public regardless of whether such disclosure is explicitly recited in the claims. No claim element is to be construed under the provisions of 35 U.S.C. §112, sixth paragraph, unless the element is expressly recited using the phrase "means for" or, in the case of a method claim, the element is recited using the phrase "step for."

What is claimed is:

1. A method of channel estimation, comprising:
   receiving a signal from a multipath fading channel, the signal including a plurality of pilot tones;
   deriving timing information for a plurality of multipath signal arrivals;
   estimating the response of the channel from the pilot tones; and
   adapting the length of delay the channel response is estimated from the timing information for the multipath signal arrivals.

2. The method of claim 1 wherein the signal further includes a plurality of spread-spectrum pilot signals, the timing information for the mulitpath signal arrivals being derived from the spread-spectrum pilot signals.

3. The method of claim 2 wherein the signal further comprises Orthogonal Frequency Division Multiplexing (OFDM) data punctured into spread-spectrum data, the method further comprising synchronizing the processing the OFDM data based on the timing information for the multipath signal arrivals.

4. The method of claim 1 wherein the timing information used to adapt the length of time the channel response is estimated includes timing information for the earliest multipath signal arrival and the latest multipath signal arrival.

5. The method of claim 4 wherein the length of time the channel response is estimated is adapted to equal the delay between the earliest multipath signal arrival and the latest multipath signal arrival.

6. The method of claim 5 wherein the length of time the channel response is estimated is adapted by adjusting the delay to account for delay dispersion introduced by one or more pulse-shaping filters.

7. The method of claim 4 wherein the length of time the channel response is estimated is adapted by determining that the delay between the earliest multipath signal arrival and the latest signal path arrival exceeds the minimum delay, and adapting the length of time to estimate the channel response to the larger of the estimated length and the minimum delay.

8. The method of claim 4 wherein the length of time the channel response is estimated is adapted by determining that the delay between the earliest multipath signal arrival and the latest signal path arrival is below the maximum delay, and adapting the length of time to estimate the channel response to the smaller of the estimated length and the maximum delay, the maximum delay being a function of the number of pilot tones.

9. A method of channel estimation, comprising:
   receiving a signal including a plurality of pilot tones and spread-spectrum pilot signals;
   estimating the response of the channel from the pilot tones; and
   adapting the length of time the channel response is estimated based on the spread-spectrum pilot signals.

10. The method of claim 9 wherein the signal further comprises OFDM data punctured into spread-spectrum data, the method further comprising synchronizing the processing of the spread-spectrum data based on timing information derived from the spread-spectrum pilot signals.

11. The method of claim 9 wherein the channel is a multipath fading channel, the method further comprising deriving timing information for a plurality of multipath signal arrivals from the spread-spectrum pilot signals, the timing information for the multipath signal arrivals being used to adapt the length of time the channel response is estimated.

12. The method of claim 11 wherein the timing information used to adapt the length of time the channel response is estimated includes timing information for the earliest multipath signal arrival and the latest multipath signal arrival.

13. The method of claim 12 wherein the length of time the channel response is estimated is adapted to equal the delay between the earliest multipath signal arrival and the latest multipath signal arrival.

14. The method of claim 13 wherein the length of time the channel response is estimated is adapted by adjusting the delay to account for delay dispersion introduced by one or more pulse-shaping filters.

15. The method of claim 12 wherein the length of time the channel response is estimated is adapted by determining that the delay between the earliest multipath signal arrival and the latest signal path arrival exceeds a maximum delay, and adapting the length of time to estimate the channel response to the maximum delay, the maximum delay being a function of the number of pilot tones.

16. The method of claim 12 wherein the length of time the channel response is estimated is adapted by determining that the delay between the earliest multipath signal arrival and the latest signal path arrival is below a minimum delay, and adapting the length of time to estimate the channel response to the minimum delay.

17. A receiver, comprising:
   a rake receiver configured to derive timing information from a signal transmitted over a multipath fading channel, the timing information relating to a plurality of multipath signal arrivals; and
   a demodulator configured to extract a plurality of pilot tones from the signal, the demodulator including a channel estimator having a delay spread capable of being adapted by the timing information from the rake receiver, the channel estimator being configured to estimate the response of the channel from the pilot tones.

18. The receiver of claim 17 wherein the rake receiver is further configured to derive the timing information from a plurality of spread-spectrum pilot signals in the signal.

19. The receiver of claim 18 wherein the demodulator is further configured to process OFDM data punctured into the signal, the processing of the OFDM data being synchronized by the timing information relating to the multipath arrivals.

20. The receiver of claim 17 wherein the timing information generated by the rake receiver includes timing information for the earliest multipath signal arrival and the latest multipath signal arrival.

21. The receiver of claim 20 wherein the channel estimator is further configured to compute the delay between the earliest multipath signal arrival and the latest multipath signal arrival, and adapt the delay spread to the computed delay if the computed delay is within a range.

22. The receiver of claim 21 wherein the channel estimator is further configured to account for delay dispersion introduced by one or more pulse-shaping filters when computing the delay.

23. The receiver of claim 21 wherein the range has a maximum delay that is a function of the number of pilot tones, the channel estimator being further configured to adapt the delay spread to the maximum delay if the computed delay exceeds the maximum delay.

24. The receiver of claim 21 wherein the range has a minimum delay, the channel estimator being further configured to adapt the delay spread to the minimum delay if the computed delay is below the maximum delay.

25. A receiver, comprising:
a rake receiver configured to derive timing information from a plurality of spread-spectrum pilot signals in a signal transmitted over a channel; and
a demodulator configured to extract a plurality of pilot tones from the signal, the demodulator including a channel estimator having a delay spread capable of being adapted by the timing information from the rake receiver, the channel estimator being configured to estimate the response of the channel from the pilot tones.

26. The receiver of claim 25 wherein the demodulator is further configured to process OFDM data punctured into the signal, the processing of the OFDM data being synchronized by the timing information derived from the spread-spectrum pilot signals.

27. The receiver of claim 25 wherein the channel is a multipath fading channel, and the timing information relates to a plurality of multipath signal arrivals.

28. The receiver of claim 27 wherein the timing information generated by the rake receiver includes timing information for the earliest multipath signal arrival and the latest multipath signal arrival.

29. The receiver of claim 28 wherein the channel estimator is further configured to compute the delay between the earliest multipath signal arrival and the latest multipath signal arrival, and adapt the delay spread to the computed delay if the computed delay is within a range.

30. The receiver of claim 29 wherein the channel estimator is further configured to account for delay dispersion introduced by one or more pulse-shaping filters when computing the delay.

31. The receiver of claim 29 wherein the range has a maximum delay that is a function of the number of pilot tones, the channel estimator being further configured to adapt the delay spread to the maximum delay if the computed delay exceeds the maximum delay.

32. The receiver of claim 29 wherein the range has a minimum delay, the channel estimator being further configured to adapt the delay spread to the minimum delay if the computed delay is below the maximum delay.

* * * * *